P. N. JONES.
PASSENGER CAR.
APPLICATION FILED FEB. 17, 1910.
962,225.
Patented June 21, 1910.
2 SHEETS—SHEET 2.
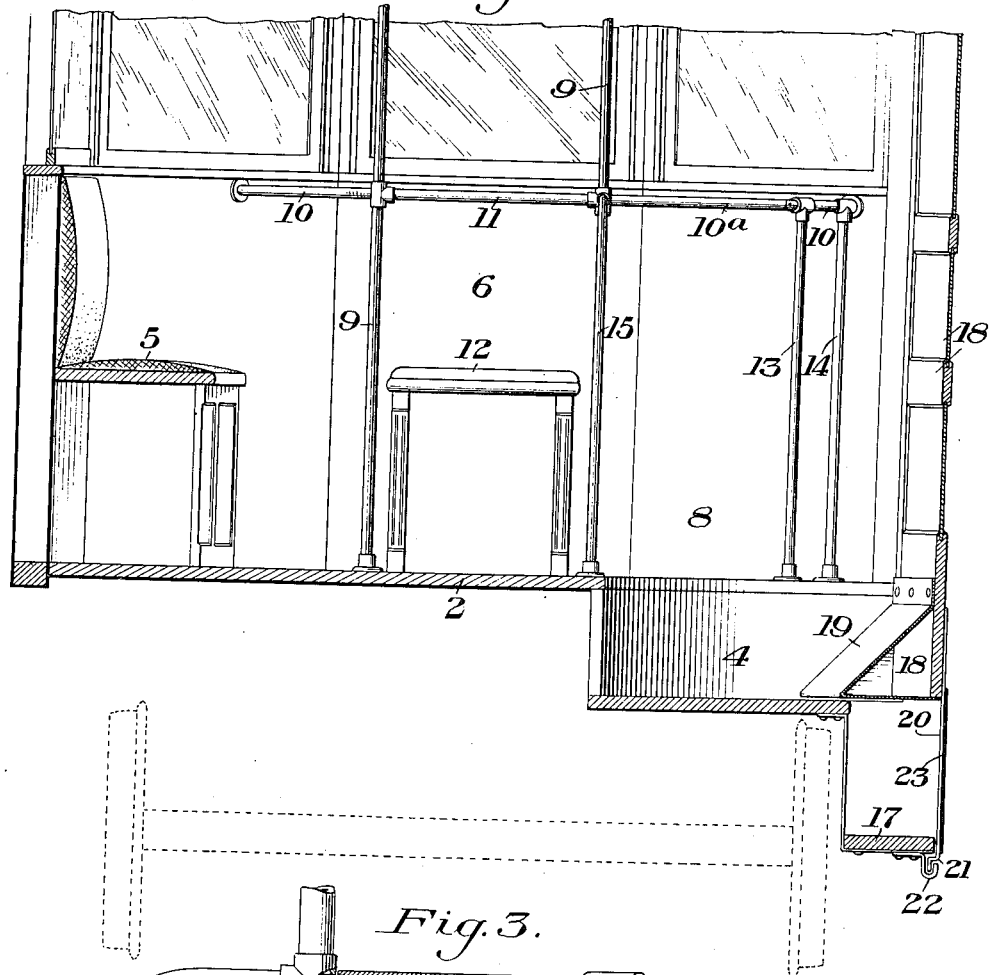
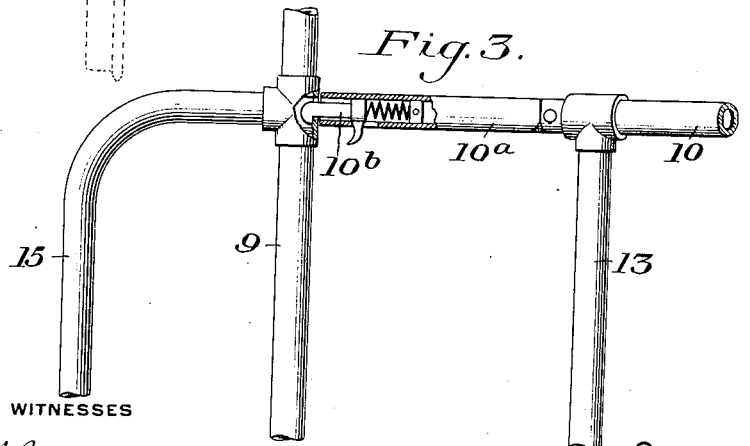
WITNESSES
INVENTOR

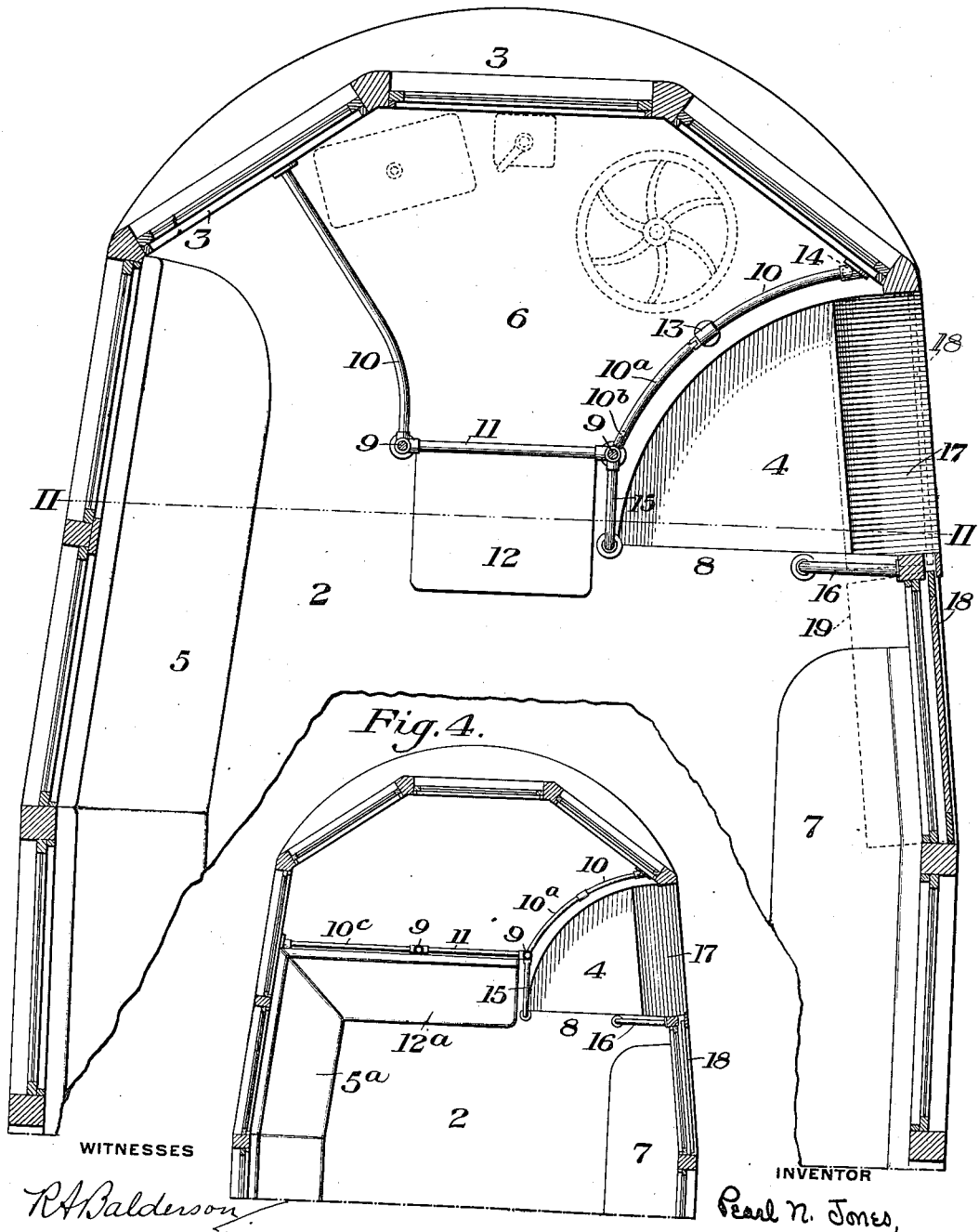

UNITED STATES PATENT OFFICE.

PEARL N. JONES, OF PITTSBURG, PENNSYLVANIA.

PASSENGER-CAR.

962,225.

Specification of Letters Patent. Patented June 21, 1910.

Application filed February 17, 1910. Serial No. 544,342.

*To all whom it may concern:*

Be it known that I, PEARL N. JONES, of Pittsburg, Allegheny county, Pennsylvania, have invented a new and useful Improvement in Passenger-Cars, of which the following is a full, clear, and exact description, reference being had to the accompanying drawings, forming part of this specification, in which—

Figure 1 is a sectional plan view of the front end portion of a passenger car embodying my invention, with the exit door open; Fig. 2 is a transverse section on the line II—II of Fig. 1, with the exit door closed; Fig. 3 is a detail view; and Fig. 4 is a view similar to Fig. 1 but on a smaller scale and showing a modification.

My invention has relation to certain new and useful improvements in passenger cars, and is designed to provide a car of increased seating capacity.

A further object of the invention is to provide a novel arrangement of the exit passage at the forward end of the car and to provide a novel arrangement of the space or cage for the motorman, controller, brake apparatus, etc.

The nature of my invention will be best understood by reference to the accompanying drawings, which will now be described, it being premised, however, that various changes can be made in the details of the construction and arrangement of the parts without departing from the spirit and scope of my invention as defined in the appended claims.

In these drawings, the numeral 2 designates the floor of the car, which is carried through at the same level to the front end 3 of the car, with the exception of a depression 4, which is formed at one side to constitute an exit passage as hereinafter more fully described. The car seats are arranged along the sides of the car at the end, and the seats 5 at the side opposite the exit are carried forwardly to the forward end 3 of the car and extend at the side of the space or cage 6, which is provided for the motorman. The seats 7 at the opposite side of the car terminate a short distance back of the exit passage 8.

The cage 6 is preferably formed by means of the two vertical posts 9, which extend from the floor to the roof of the car, one on each side of the longitudinal center of the car, with curved bars or railings 10 extending forwardly and laterally from each of these posts, to the front wall 3, the two posts also being connected by a short transverse railing 11. A central rearwardly facing seat 12 may be provided in the rear of the railing 11. One of the railings 10 is preferably provided with a hinged section 10ª normally secured by a latch device 10ᵇ, which latch may be released by the motorman and the hinged section dropped down to permit him to leave the cage to throw a switch, or for other purposes. The stationary portion of this railing member is also preferably provided with the two vertical posts 13 and 14, which extend downwardly to the floor of the car, the post 14 providing a hand-hold for passengers.

The exit passage 8 leading from the body of the car to the depression 4 preferably has a guard rail 15 at one side adjacent to the seat 12, and also a guard rail 16 adjacent to the forward end of the side seat 7. The depression 4 extends sufficiently below the floor level of the car to form a step, which leads to a second step 17, which is suitably supported from the car frame, and from which the passengers alight, the inner edge of the step 17 being inset considerably inward from the side line of the car, and its outer edge being preferably substantially coincident with the side line of the car.

18 designates a sliding door, which may be controlled by the motorman in any well known or desired manner. This door extends from the top of the car downwardly to about the level of the depressed floor portion 4, and is provided at its inner side with an inwardly projecting guard 19, which, when the door is closed, as shown in Fig. 2, projects inwardly over the depressed floor portion 4, and prevents the possibility of any one stepping from the said floor portion onto the step 17 until the door has been opened. The lower edge of the door is also provided with one or more downwardly extending straps 20 having a bent portion 21 at the lower end, which travels in a suitable guide 22, secured to the step 17, and serving to guide the sliding movement of the door. The lower edge of the door is also preferably provided with an extension 23, which may be of sheet metal, and which closes the entrance to the step 17 when the door is closed. When the door is opened the shield 19 slides backwardly underneath the floor of the car, as indicated in dotted lines in Fig. 1.

In Fig. 4 I have shown a modification in which, instead of extending the side seat 5ª into the space at one side of the motorman's cage, such seat terminates back of such cage, and the central seat 12ª is extended transversely across the car to meet the end of the seat 5ª. The guard rail 11 is also provided with the transverse extension 10ᶜ at the back of the seat 12ª, this extension taking the place of the curved guard rail 10 at that side.

By the construction and arrangement of the car as above described, whereby the seats at one side of the car are extended to the extreme forward end thereof, together with the provision of means whereby a central seat 12 may be added, I materially increase the seating capacity of the car. The arrangement of the car railings around the space occupied by the motorman and the controller, brake apparatus, &c., effectively prevent the encroachment upon this space by the passengers, and also prevent injury to the passengers by coming in contact with the controller or brake mechanism. The door arrangement construction is such that no passenger can leave the car until the door has been opened, and the outer step is so guarded as to prevent any possibility of anyone jumping thereon while the car is in motion.

It will be obvious that various changes can be made in the details of construction and arrangement of the various parts, such as the guard railings, and other details, without departing from my invention.

What I claim is:—

1. In a passenger car, a car floor extending at the same level to the extreme front end of the car, and having at one side a depressed portion forming an exit step, the inner side of said depressed portion extending backwardly and inwardly at an angle to the longitudinal axis of the car; substantially as described.

2. In a passenger car, a car floor having near one end of the car and at the side thereof a depressed portion forming an exit step and platform, and leading at its outer edge to a second and lower step, and an inwardly and rearwardly extending guard at the inner side of said depressed portion and separating it from the motorman's station; substantially as described.

3. In a passenger car, a car floor having near one end of the car and at the side thereof a depressed portion forming an exit step and platform, and leading at its outer edge to a second and lower step, an inwardly and rearwardly extending guard at the inner side of said depressed portion and separating it from the motorman's station, and a guard extending from the side of the car partially across the inner side of said depressed portion; substantially as described.

4. In a passenger car, a car floor having near one end of the car and at the side thereof a depressed portion forming an exit step and platform, and leading at its outer edge to a second and lower step, and an inwardly and rearwardly extending guard at the inner side of said depressed portion and separating it from the motorman's station, and the car having a central seat immediately in rear of the motorman's station and separated from the said depressed portion by the rear portion of said guard; substantially as described.

5. A passenger car having rearwardly converging guards at the front end of its interior and inclosing a space or station for the motorman, an exit passage at one side of said station, said passage having a depressed floor portion, the inner edge of which extends backwardly and inwardly at an angle to the longitudinal axis of the car, and there being an open space at the other side of the station into which the car seats extend; substantially as described.

6. A passenger car having rearwardly converging guards at the front end of its interior and inclosing a space or station for the motorman, an exit passage at one side of said station, there being an open space at the other side of the station into which the car seats extend, together with a central rearwardly facing seat immediately in rear of the said station, and a guard at one side of said seat and between it and the exit passage; substantially as described.

7. A passenger car having an exit step at its forward end within the side lines of the car, a door over the outer edge of said step and arranged to slide rearwardly into a receiving space in the side wall of the car, and a depressed floor portion leading to said step, said floor portion having a rearwardly and inwardly extending inner side and being located at one side of the motorman's station; substantially as described.

8. A passenger car having an exit opening at its forward end at one side, a depressed step portion within the side lines of the car adjacent to said opening, a sliding door controlling said opening, and an exit step, the door having an inwardly projecting guard portion adapted to extend over the step when the door is closed; substantially as described.

9. A passenger car having an exit opening at one side, a sliding door controlling said opening, a depressed step portion, and an exit step, both within the side lines of the car, the door having a guard portion arranged to extend inwardly over the exit step when the door is closed, and a guide extension projecting downwardly from the door and engaging a guide carried by the exit step; substantially as described.

In testimony whereof, I have hereunto set my hand.

P. N. JONES.

Witnesses:
 Geo. H. Parmelee,
 H. M. Corwin.